June 28, 1955
H. G. SCHWARZ
2,712,092
DEFLECTION CIRCUIT
Filed Aug. 24, 1953
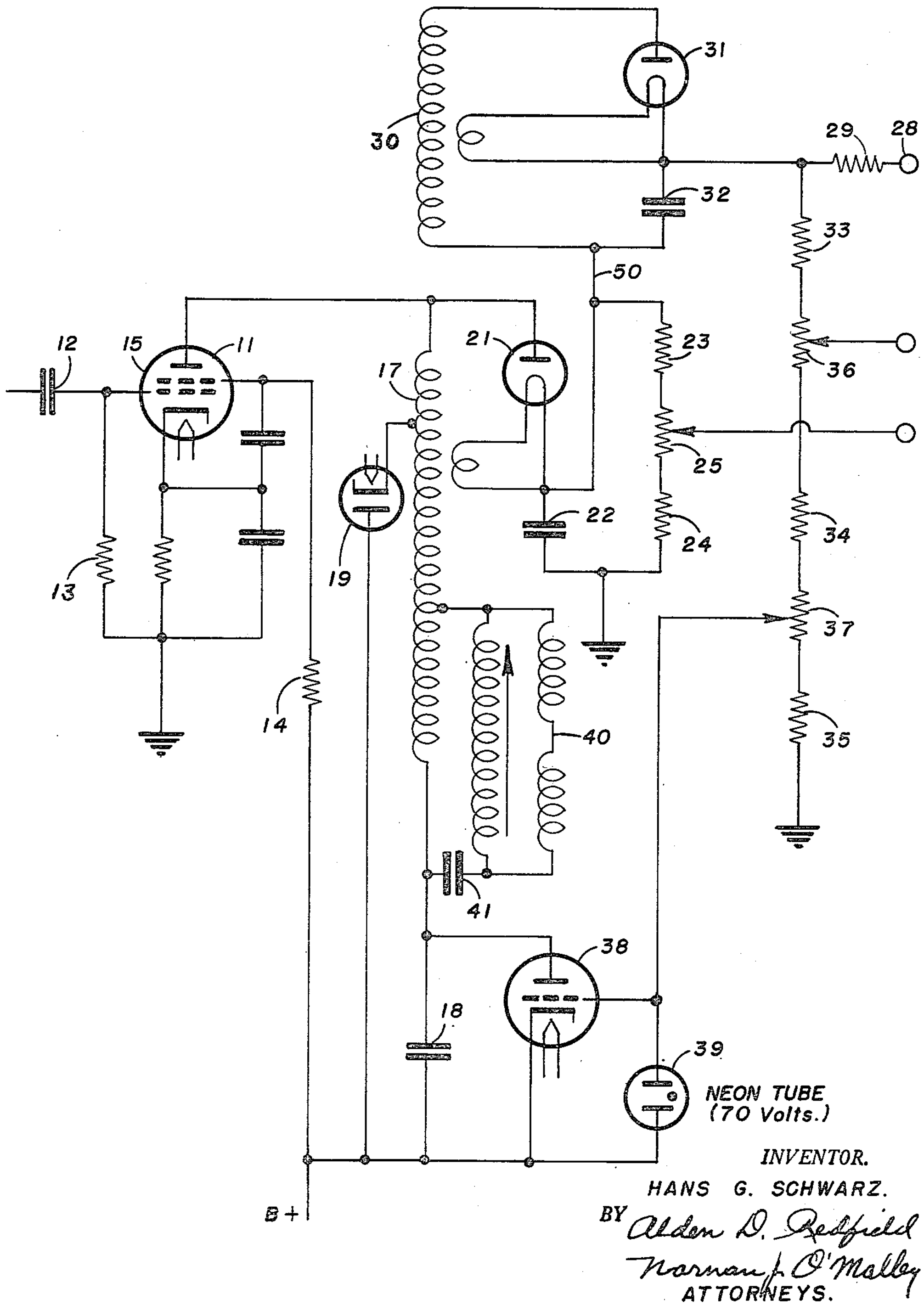
INVENTOR.
HANS G. SCHWARZ.
BY Alden D. Redfield
Norman J. O'Malley
ATTORNEYS.

United States Patent Office 2,712,092
Patented June 28, 1955

2,712,092

DEFLECTION CIRCUIT

Hans G. Schwarz, Cincinnati, Ohio, assignor to Avco Manufacturing Corporation, Cincinnati, Ohio, a corporation of Delaware Application August 24, 1953, Serial No. 376,209

6 Claims. (Cl. 315—27)

This invention relates generally to television receiver high voltage supply sources and more specifically to television receiver high voltage supply sources of the regulated type.

Flyback or kickback high voltage supply systems of the type described on pages 147–149 in "Elements of Television Systems," by George E. Anner, published by Prentice-Hall, Inc., New York, New York, 1951, have long been used in television receivers of the black and white type, and their efficiency and other advantageous attributes are well known to those skilled in the art. To date the majority of color television receiver circuits have used a separate radio frequency type of high voltage supply, at a greater cost and lower efficiency than that provided by a flyback system. This has been considered necessary because of the inherent large power requirements of the tri-color kinescope, as it is presently known, and its need for a closely regulated power source. Though the regulatory voltage variations common in conventional flyback circuits could be tolerated in black and white systems without too serious a loss of picture quality, this is not true in color television receivers. There the requirements are far more critical because of the higher beam current required and because both focus and convergence voltages are usually taken from a bleeder connected across the high voltage source. Thus, a well regulated source of high potential is considered essential.

Further, in all flyback circuits wherein the deflection voltage is taken from across the transformer winding, the capacitance seen across the deflection yoke primarily comprises various reflected distributed capacitances associated with the remainder of the deflection circuit. These capacitances are reflected back to the deflection yoke multipled by a factor equal to the square of the turns ratio, and since the capacitance seen across the deflection yoke determines retrace time, it is apparent that any increase in this reflected capacitance undesirably increases retrace.

Thus, in circuits where the turns ratio between the deflection yoke tap and the high voltage tap may be approximately 10 to 1, the yoke sees a capacitance having a value of 100 times the capacitance seen at the high end of the high voltage winding. It should be apparent that the still larger high voltage requirements of tri-color kinescopes require still higher turns ratios, which reflect excessive capacitance across the yoke and increase retrace time beyond permissible limits.

One solution to the regulation problem has been to furnish a dummy tube connected in shunt with the color kinescope and controlled directly from the high potential. In these circuits, the dummy tube is controlled so that as the current taken by the color kinescope varies, the current taken by the dummy tube varies equally in opposite manner, with the result that the total current supplied to the combination of the dummy tube and the color kinescope is held relatively constant at all times. Though the dummy tube type of system has merit, tubes which are satisfactory for this purpose are relatively expensive.

Various solutions to the capacitance problem of conventional flyback circuits have been proposed and adopted; however, most of them have proved to be expensive solutions to the problem. Thus, it would be desirable to provide a flyback or kickback circuit which, first, can be regulated without the need of a relatively expensive dummy tube of the shunt regulator type and, second, which will not reflect excessive capacitance across the deflection yoke.

Therefore, it is an object of this invention to provide a relatively simple, cheap and highly efficient regulated flyback high voltage supply circuit for television receivers.

It is a further object of this invention to provide a regulated high voltage circuit which reflects a minimum capacitance in shunt with the deflection yoke circuit.

It is a still further object of this invention to provide a regulated high voltage supply for television receivers having a regulating circuit which derives its control voltage directly from the high potential to control a low voltage regulating tube in the B boost circuit.

Briefly, my invention comprises a conventional flyback circuit improved to include a regulating circuit in the B boost portion of the circuit and to include a separate secondary high potential winding across the high potential rectifier. Contrary to the usual practice, the high potential secondary in my circuit does not comprise all or any portion of the winding of an autotransformer. Instead it is a completely separate winding, magnetically coupled to the relatively low potential primary to provide the necessary high potential.

For a better undertsanding of my invention, together with other and further objects, advantages and capabilities thereof, reference is made to the following description and appended claims in connection with:

The accompanying drawing, single figure, in which there is shown a specific embodiment of my television receiver flyback high potential circuit.

In the specific embodiment shown, I provide a driver tube 11 having a control grid coupled by capacitor 12 and grid leak resistor 13 to a source of saw-tooth potential, not shown. The screen grid of tube 11 is supplied from a source of B+, not shown, through resistor 14. The anode 15 of driver tube 11 is directly coupled to the high potential end of primary winding 17 of the deflection transformer. The low potential end of winding 17 is coupled through B boost capacitor 18 to the potential source B+, not shown.

Damper diode 19 has its anode coupled to the source of B+ and its cathode coupled to a tap on winding 17. Diode 21 has its anode coupled directly to the high potential end of winding 17 and its cathode coupled through capacitor 22 to ground. A voltage divider comprising resistors 23 and 24 and potentiometer 25 is coupled directly across capacitor 22. Kinescope focus voltage may be tapped from the variable arm of potentiometer 25.

High potential secondary winding 30 is connected at one end to the anode of high potential rectifier 31 and at the other end through capacitor 32 to its cathode. The two rectifier circuits including diodes 21 and 31 are connected in series through conductor 50. A bleeder resistor, comprising resistor elements 33, 34, 35 and potentiometers 36 and 37, is connected between the cathode of high voltage rectifier 31 and ground, or an equi-potential plane. High potential terminal 28 is connected through resistor 29 to the cathode of the high voltage rectifier 31.

Regulator tube 38 is coupled directly across the B boost capacitor 18, and neon voltage regulating tube 39 is connected between the control grid and the cathode of the regulator tube 38. Signal voltage for controlling the regulator tube is taken from the sliding terminal arm on potentiometer 37. The deflection yoke 40 is coupled across a portion of winding 17 through capacitor 41.

Considering operation of the specific embodiment shown in the drawing, let it be assumed that the cycle has reached the start of retrace, at which time there is a maximum current flowing through the yoke 40 and winding 17. When retrace starts, driver tube 11 is cut off by the sawtooth signal on its control grid, shock exciting the system into oscillation; and the current flowing through the yoke, no longer having a path through the anode-cathode circuit of driver tube 11, charges up the distributed capacitance seen across the yoke. Thus, when the yoke current goes through zero, there is a maximum voltage across the distributed capacitance and across winding 17.

The voltage impressed across primary winding 17 induces a voltage across winding 30 by transformer action, and when the current through yoke 40 goes through zero, the resulting peak high voltage impressed across primary winding 17 is transformed across secondary 30 and rectified in diode 31, charging up capacitor 32.

The current through the deflection coil reverses direction when the distributed capacitance across the coil 40 starts to discharge, driving rapidly to a maximum in a polarity direction reverse to that taken during trace. When the voltage on the anode of driver tube 11, or the cathode of damper tube 19, tends to go negative, damper tube 19 starts to conduct, and the current flow through the deflection coil 40 is loaded sufficiently so that the rate of change of coil current is maintained relatively constant. This is due to the action of damper tube 19 which seeks to maintain the voltage on its cathode and across deflection yoke 40 relatively constant. Thus, if the yoke voltage be considered as "$e$" in the equation $$e = -L\frac{di}{dt}$$

and L is considered as the inductance of the yoke 40, it can be seen that $$\frac{di}{dt}$$

which is the rate of change of yoke current, is also maintained relatively constant.

Before the current through damper tube goes to zero, driver tube 11 is driven into conduction by the sawtooth signal on its control grid, and both driver tube 11 and damper diode 19 conduct at the same time. Current flow through the driver tube is slightly greater than that necessary to maintain a linear rate of change of current through yoke 40, but increased current flow through diode 19 automatically compensates, and thus the rate of current change through the deflection yoke remains relatively linear. Thus, it is seen that a portion of the trace current through deflection yoke 40 is a result of anode current flow through driver tube 11 and that the remaining portion of trace current is due to the oscillatory action of the deflection system in conjunction with the linearizing effect of damper diode 19.

The damping diode 19 not only serves to prevent continued oscillations in the deflection system after retrace and to linearize current flow through the deflection coils, but it also serves to convert some or most of the energy stored in the deflection during trace, into a useful D.-C. voltage. When damping diode 19 begins to conduct, capacitor 18, hereinafter to be known as the B boost capacitor, receives a charge making its upper plate positive relative to its lower plate. In the average circuit, the B boost capacitor or capacitors charge up to a voltage which is approximately 30% to 50% of the B+ low voltage supply voltage. This boost voltage across the capacitor being in series with the B+ supply voltage and connected polarity aiding, as far as the plate circuit of driver tube 11 is concerned, supplies a portion of the energy dissipated in the deflection circuitry. That is, the energy which is released from the magnetic field when the deflection system is shock excited into oscillation, is first stored on B boost capacitor 18 and then returned to the system when driver tube 11 again conducts.

Variations in the B boost voltage causes similar variations in the high voltage output. Thus, when the B boost voltage decreases, the energy returned to the system decreases and the total energy stored in the magnetic field decreases. Thus, the high voltage supplied at terminal 32 decreases because the magnetic field which collapses to produce this voltage also decreases.

Conversely, when the voltage across the B boost capacitor increases, more energy is restored to the system, increasing the energy stored in the magnetic field, with a resulting increase in the high voltage supplied at terminal 32. With this in mind, I have provided a regulator tube 38 which is connected in shunt with the B boost capacitor 18 and controlled by potentiometer 37 which has a resistor element connected into a bleeder resistance tapped across the high voltage supply terminal. By adjusting the variable arm on potentiometer 37 it is possible to reflect any increase in the high voltage on terminal 32 to the control grid of tube 38 in such manner as to increase current flow in the anode-cathode path of tube 38. This increased current flow tends to increase the discharge of capacitor 18 and lower the B boost voltage, thereby decreasing the energy stored in the deflection system and, in turn, lower the high voltage generated by the smaller collapsing magnetic field.

When the high voltage drops, due to increased loading by the cathode-ray tube, the potential on the control grid of regulator tube 38 also drops, decreasing current flow through the anode-cathode path of the regulator tube. Thus, less energy is dissipated by the regulator tube and the increased B boost voltage results in more energy being returned to the system and an increase in the high voltage output. The regulator tube, in effect, acts as a variable load across the B boost capacitor 18.

The advantages of this type of regulator circuit over the type located in shunt with the cathode-ray tube second anode circuit or the high potential electrode of a color kinescope, are chiefly economical. Only readily available components are involved.

Neon tube 39, which is connected between the control grid and cathode of tube 38, functions to protect tube 38 when the circuit is first connected to a source of B+, and before the filaments of the high voltage rectifiers heat up. When the circuit is first connected there is no high voltage, and in the absence of neon tube 39 the grid of tube 38 is at ground potential and the cathode at B+. Normally this could cause a flash-over between the cathode and grid, with resulting damage to the tube. As long as neon tube 39 is in the circuit, the voltage between the cathode and grid of tube 38 can go no higher than voltage across the conducting neon tube. In the specific embodiment illustrated and built, the neon tube was selected to hold this potential difference to a safe maximum of 70 volts.

The high voltage supply consists of two rectifier circuits, i. e., rectifier 21 and rectifier 31, the outputs of which are series connected. In the specific embodiment shown, a bleeder resistor is connected across the output of rectifier 21, which supplies approximately 5 kilovolts to be used as a source of focus electrode voltage. Rectifier 31, which is coupled across secondary winding 30, supplies the major portion of the high voltage, e. g., in the specific embodiment disclosed, rectifier 31 supplied approximately 15 kilovolts. This voltage, when added to the 5 kilovolts supplied by rectifier 21, provides a total of 20 kilovolts, which was the voltage required for a given tri-color tube.

This arrangement of rectifiers has an important advantage over conventional doubler circuits in that it does not require either a coupling resistor or a coupling diode between the two rectifiers. A coupling resistor in a 20 kilovolt power supply would result in an excessive voltage drop and excessive power loss. A coupling diode, together with its corona shield and filament winding, adds considerable capacity, which is reflected across the deflection yoke, causing excessive retrace time.

This rectifier combination has a further advantage over ordinary autotransformer circuits in that the secondary winding 30 is separate unto itself and not a portion of primary winding 17 as in the ordinary autotransformer circuit. Thus, the capacitance seen at the high voltage rectifier anode is not reflected into the deflection coil circuits with as high a multiplying factor as would result in a conventional autotransformer circuit.

For example, consider a 20 kilovolt autotransformer type of circuit where the secondary winding also includes the primary winding and where the deflection coils are across 2 kilovolt taps on the primary winding. The turns ratio between the high voltage end of the winding and the deflection coil tap would thus be 10 to 1. Since the capacitance at the high voltage end of the winding is reflected across the deflection coil winding taps as a square of this ratio, the deflection coil would be expected to see a capacitance 100 times the capacitance seen at the high voltage end of the winding. This turns ratio increases where higher voltages are required, aggravating the problem.

Contrast this with the result in my circuit, where the high voltage secondary is separated from the primary. Thus, in a 20 kilovolt circuit, approximately 14 kilovolts may be provided by the secondary coil winding, such as coil 30, and if the deflection coil is allowed to remain across a 2 kilovolt portion of the primary winding, the turns ratio between the secondary and the deflection coil portion of the primary is merely 7 to 1, as contrasted with the former 10 to 1. As a result, the capacitance seen at the high voltage end of the secondary winding is reflected across the deflection yoke multiplied by a factor of only 49, or the square of the new turns ratio in lieu of the former multiplying factor of 100.

While I do not desire to be limited to any specific circuit parameters, such parameters varying in accordance with the requirements of individual television receiver circuits, the following circuit values have been found entirely satisfactory in the specific and successful illustrated embodiment of the invention:

| | | |
|---|---|---|
| Tubes: | | |
| 11 | | 6CD6 |
| 19 | | 6U3 |
| 21, 31 | | 1B3 |
| 38 | | 6AG7 |
| Resistors: | | |
| 13 | megohm | 1 |
| 14 | ohms | 10,000 |
| 23 | megohms | 1.5 |
| 24 | do | 3.9 |
| 25 | do | 25 |
| 33 | do | 110 |
| 34 | do | 84 |
| 35 | do | 27 |
| 36 | do | 15 |
| 37 | do | 1 |
| Capacitors: | | |
| 22 | microfarads | 500 |
| 32 | do | 1000 |

While there has been shown and described what is at present considered the preferred embodiment of the present invention, in view of this disclosure it will become obvious to those skilled in the art that various changes and modifications may be made without departing from the invention as defined in the appended claims.

Having thus described my invention, I claim:

1. In a television receiver magnetic deflection circuit, the combination comprising a driver tube having a grid signal controlled anode-cathode path series connected through a transformer primary winding to a voltage source, deflection coils tapped across a portion of said primary winding, a first rectifier circuit coupled to rectify the primary winding voltage, a separate secondary winding coupled across a second rectifier circuit, means connecting the rectifiers in series across high voltage output terminals.

2. In a television receiver magnetic deflection circuit, the combination comprising a driver tube having an anode-cathode path series connected through a transformer primary winding and a B boost capacitance to a voltage source, deflection coils tapped across a portion of said primary winding, a unilateral damping means coupled across said deflection coils to charge said capacitance during retrace, a first rectifier circuit coupled to rectify the voltage across said primary winding, a separate secondary winding coupled across a second rectifier circuit, means connecting the rectifiers in series across high voltage output terminals.

3. In a television receiver magnetic deflection circuit, the combination comprising a driver tube having an anode-cathode path series connected through a transformer primary winding and a B boost capacitance to a voltage source, magnetic deflection coils tapped across a portion of said primary winding, a unilateral damping means coupled across said deflection coils to charge said capacitance during retrace, a first rectifier circuit coupled to rectify primary winding voltage, a separate secondary winding coupled across a second rectifier circuit; means connecting the rectifiers in series across high voltage output terminals.

4. In a television receiver magnetic deflection system, the combination comprising a series circuit including a driver tube, a transformer primary winding, a B boost capacitance means, and a power source; magnetic deflection coils coupled across a portion of said primary winding; a rectifier circuit coupled to rectify the voltage across said transformer primary winding; a unilateral damping circuit coupled across a portion of said primary winding and said B boost capacitor for providing deflection current oscillation damping current flow through said B boost capacitor; a transformer secondary winding separate from but magnetically coupled to said primary winding and electrically coupled across a second rectifier circuit; means connecting the outputs of the two rectifier circuits to provide a high voltage supply source; a grid controlled regulator tube coupled across said B boost capacitance means for supplying a variable load across said capacitor; a voltage divider coupled across said high voltage supply having a regulator tube control grid tap for providing a regulator tube control signal which reflects variations in the high potential supply.

5. In a television receiver magnetic deflection system, the combination comprising a series circuit including a driver tube, a transformer primary winding, a B boost capacitance means, and a power source; magnetic deflection coils coupled across a portion of said primary winding; a rectifier circuit coupled to rectify the primary winding voltage; a unilateral damping circuit coupled across a portion of said primary winding and said B boost capacitor for providing deflection circuit oscillation damping current to flow through said B boost capacitor; a transformer secondary winding separate from but magnetically coupled to said primary winding and electrically coupled across a second rectifier circuit; means coupling the outputs of the two rectifier circuits in series to provide a high voltage supply source; a grid controlled regulator tube coupled across said B boost capacitance means for providing a variable load across said capacitance; and means for providing a regulator tube grid control signal which reflects variations in the high potential supply.

6. In a television receiver magnetic deflection system, the combination comprising a series circuit including the anode-cathode path of a driver tube, a flyback transformer primary winding, a B boost capacitance and a low voltage supply source; a deflection circuit tapped across a portion of said primary winding; a transformer secondary winding coupled to said primary winding for providing a source of high voltage; means for rectifying said high voltage; a regulator tube having a grid controlled anode-cathode path for providing a variable load in shunt with the B boost capacitance; and resistance means tapped across said high voltage for supplying grid control voltage for said regulator tube.

References Cited in the file of this patent

UNITED STATES PATENTS

| | | |
|---|---|---|
| 2,536,857 | Schade | Jan. 2, 1951 |
| 2,655,615 | Seldin | Oct. 13, 1953 |